(12) United States Patent
D'Alo et al.

(10) Patent No.: US 7,743,008 B2
(45) Date of Patent: *Jun. 22, 2010

(54) ADAPTIVE MANAGEMENT METHOD WITH WORKFLOW CONTROL

(75) Inventors: Salvatore D'Alo, Rome (IT);
Alessandro Donatelli, Rome (IT);
Giovanni Lanfranchi, Piacenza (IT);
Claudio Marinelli, Latina (IT)

(73) Assignee: International Business Machines Corporation, Armonk, NY (US)

( * ) Notice: Subject to any disclaimer, the term of this patent is extended or adjusted under 35 U.S.C. 154(b) by 1595 days.

This patent is subject to a terminal disclaimer.

(21) Appl. No.: 11/006,852

(22) Filed: Dec. 8, 2004

(65) Prior Publication Data

US 2006/0020801 A1    Jan. 26, 2006

(30) Foreign Application Priority Data

Dec. 30, 2003    (EP)    .................................. 03368130

(51) Int. Cl.
G06F 17/00 (2006.01)
G06F 15/16 (2006.01)
G06F 9/445 (2006.01)

(52) U.S. Cl. .................. 706/46; 717/176; 717/177; 709/201; 709/203; 709/221

(58) Field of Classification Search ................ 706/47; 713/173; 717/176; 709/210, 244
See application file for complete search history.

(56) References Cited

U.S. PATENT DOCUMENTS

| 5,742,829 | A | * | 4/1998 | Davis et al. | 717/178 |
|---|---|---|---|---|---|
| 5,761,380 | A | * | 6/1998 | Lewis et al. | 706/47 |
| 5,931,909 | A | * | 8/1999 | Taylor | 709/221 |
| 6,138,153 | A | * | 10/2000 | Collins et al. | 709/221 |
| 6,263,358 | B1 | * | 7/2001 | Lee et al. | 718/100 |
| 6,301,707 | B1 | * | 10/2001 | Carroll et al. | 717/177 |
| 6,314,555 | B1 | * | 11/2001 | Ndumu et al. | 717/101 |
| 6,615,218 | B2 | * | 9/2003 | Mandal et al. | 707/102 |

(Continued)

OTHER PUBLICATIONS

Arshad, N.; Heimbigner, D.; Wolf, A.L., "Deployment and dynamic reconfiguration planning for distributed software systems," Tools with Artificial Intelligence, 2003. Proceedings. 15th IEEE International Conference on , vol., No., pp. 39-46, Nov. 3-5, 2003.*

(Continued)

Primary Examiner—Donald Sparks
Assistant Examiner—David H Kim
(74) Attorney, Agent, or Firm—Steven L. Nichols; Vancott, Bagley, Cornwall & McCarthy

(57) ABSTRACT

A self-adaptive resource management method and a corresponding system. An authority publishes multiple rules into a corresponding repository. Each rule defines a desired target configuration for a category of subjects. Some rules are also associated with a corresponding stage in a predefined flow of application of the rules. A supervisor publishes the value of a current stage into a workflow repository. Each subject retrieves and applies the rules for its category and corresponding to the current stage. Information about the compliance of the subjects with the corresponding rules is published in a membership data repository. The supervisor detects the completion of the current stage when the subjects are compliant with the corresponding rules, and updates the value of the current stage to start a further stage.

10 Claims, 10 Drawing Sheets

U.S. PATENT DOCUMENTS

| | | | |
|---|---|---|---|
| 6,738,806 B1* | 5/2004 | Maryka et al. | 709/220 |
| 6,966,058 B2* | 11/2005 | Earl et al. | 717/171 |
| 7,103,874 B2* | 9/2006 | McCollum et al. | 717/121 |
| 2002/0116354 A1* | 8/2002 | Baudu et al. | 706/47 |
| 2003/0009754 A1* | 1/2003 | Rowley et al. | 717/177 |
| 2003/0192042 A1* | 10/2003 | Takemoto et al. | 717/177 |
| 2004/0019889 A1* | 1/2004 | Melchione et al. | 717/177 |

OTHER PUBLICATIONS

Berghoff, J.; Drobnik, O.; Lingnau, A.; Monch, C., "Agent-based configuration management of distributed applications," Configurable Distributed Systems, 1996. Proceedings., Third International Conference on, vol., No., pp. 52-59, 1996.*

* cited by examiner

ADAPTIVE MANAGEMENT METHOD WITH WORKFLOW CONTROL

FIELD OF THE INVENTION

The present invention relates to the field of data processing, and more specifically to a resource management method and a corresponding system.

BACKGROUND

Management of different types of resources (such as software components, applications or devices) is a critical issue in a data processing system with a distributed architecture. This problem is particularly acute when the system includes a high number of logical and/or physical entities (referred to as subjects), each one directly controlling different resources; the problem is further exacerbated if the subjects have a high level of complexity or are dispersed across a large number of installations.

The management environments known in the art are based on an enforcement model (also known as manager/workers model). In this model, the process is entirely controlled by an authority residing at a central site of the system. The authority defines a desired configuration of every subject. For this purpose, the authority accesses a central repository storing the alleged current configuration of each subject, and determines the management actions required to bring the subject to the desired configuration starting from its current configuration. The management actions are then enforced remotely by the authority on the subject, which is totally passive.

A drawback of the management environments known in the art is the lack of any kind of cooperation between the authority and the subjects. This lack of cooperation may lead to inconsistencies when the subjects are upgraded out of the control of the authority. Moreover, in the solutions currently employed, the management of subjects that are temporarily unavailable or off-line is quite difficult to implement. The known management environments also require the authority to maintain information about the location of all the subjects; at the same time, the authority must handle the communication with every subject directly.

An additional problem arises when the completion of some management actions on specific subjects is a prerequisite to the execution of further management actions on other subjects. A typical example is the deployment of a distributed software application with a client-server architecture; in this case, the installation of a client-side component of the application requires that its server-side component be already available. More complex dependencies are experienced in large and highly dynamic systems with several correlated tiers.

As a consequence, the authority must explicitly define a workflow that drives the enforcement of the management actions on the different subjects in the correct sequence. The authority must also handle any conditioning among the different stages of the workflow directly.

Moreover, the above-mentioned drawbacks increase the difficulty of correctly defining any solution to be deployed in the system.

SUMMARY

It is an object of the present invention to provide a management method that implements a self-adaptive model.

It is another object of the present invention to allow controlling the workflow without impairing the self-adaptive model.

It is an object of the present invention to resolve any dependency among the management actions.

It is another object of the present invention to ensure a correct sequencing of the management actions on the different subjects.

It is yet another object of the present invention to allow handling any conditioning among the different stages of the workflow.

Moreover, it is an object of the present invention to simplify the definition of any solution to be deployed in the system.

The accomplishment of these and other related objects is achieved, in a data processing system including a plurality of subject entities and at least one authority entity, by an autonomic management method for self-configuring the subject entities, each subject entity belonging to at least one of a plurality of categories, wherein the method includes the steps of: the at least one authority entity publishing a plurality of rules each one defining a target state for a category, at least one of the rules being associated with at least one stage in a predefined flow of application of the rules, the at least one authority entity publishing an indication of at least one current stage, and each subject entity applying each rule for the at least one category of the subject entity and corresponding to the at least one current stage, to configure the subject entity according to the target state defined in the rule.

The present invention also provides a computer program for performing the method and a product embodying the program. Moreover, a corresponding system implementing the method is also encompassed.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION

Figure 1A:
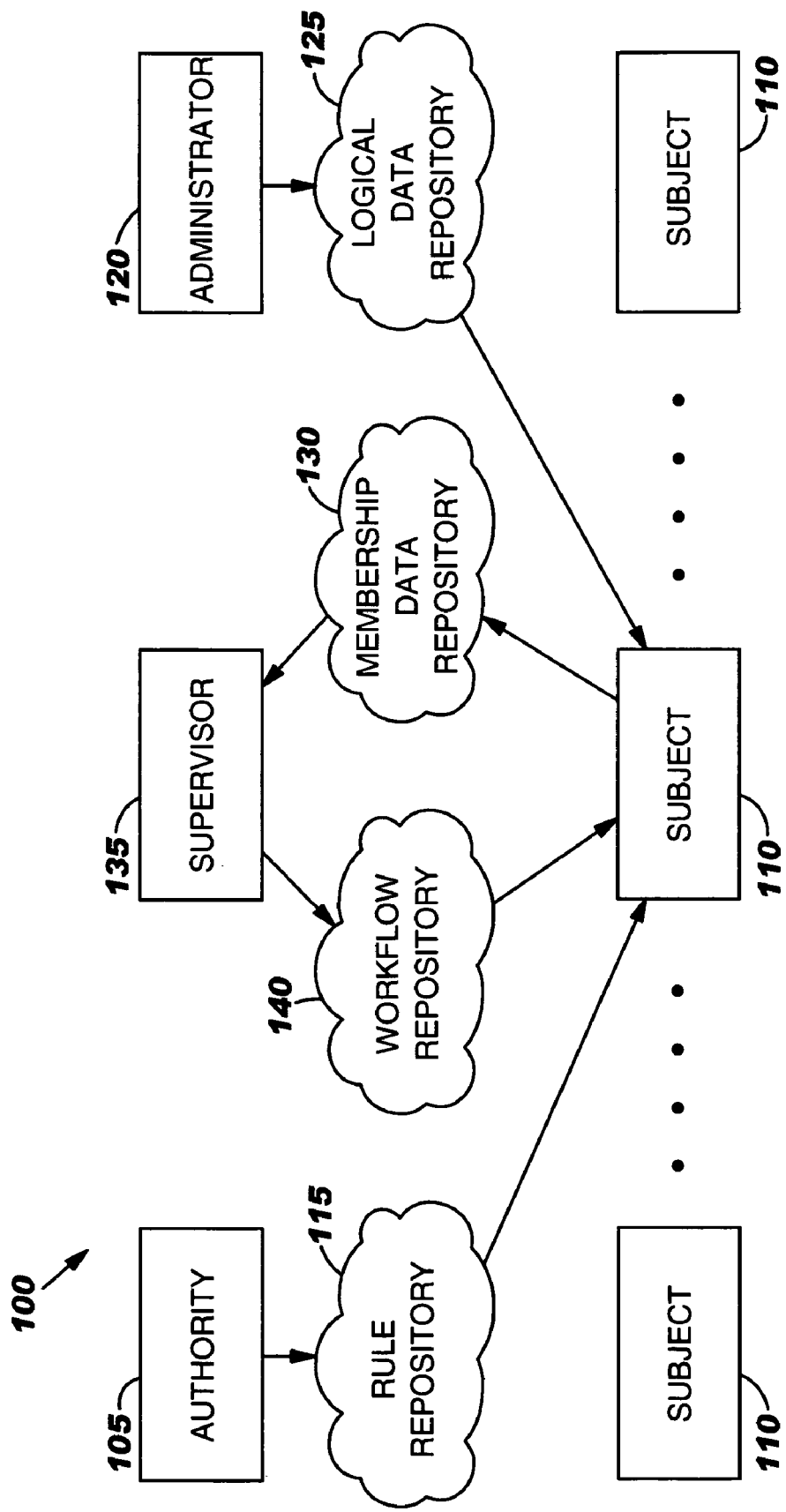
FIG. 1a is a schematic block diagram of a data processing system in which the method of the invention is applicable.

FIG. 1a shows a data processing system 100 with a distributed architecture (typically INTERNET-based). The system 100 implements an environment for managing several kinds of resources, such as products in a software distribution application, in a monitoring application, and the like.

A computer 105 operates as an authority, which is responsible to define a desired configuration of the system 100. Multiple computers 110 operate as heterogeneous subjects, which directly control one or more instances of different resources under management. Each subject 110 is defined by one or more characteristics of logical and/or physical entities (such as a desktop, a Personal Digital Assistant (PDA), a SIM card of a mobile telephone, the users of a workstation, and the like).

The authority 105 and the subjects 110 communicate in an associative way (at the information level). Particularly, the authority 105 publishes a set of rules (or laws) into a shared repository 115. Each rule specifies a desired configuration for a category of subjects, defined according to their logical and/or physical characteristics. The desired configuration is characterized by a target state of specific resources (which instances are controlled by the subjects belonging to the category specified in the rule). Some rules are also associated with one or more stages relating to a flow of application of the rules on the subjects. The subjects 110 access the rule repository 115, in order to retrieve the corresponding rules (as described in the following).

A computer 120 operates as an administrator, which is responsible for defining logical properties of the subjects 110 dynamically. The administrator publishes the information into a shared logical data repository 125, which is accessed by the subjects 110.

The subjects 110 communicate through an additional shared repository 130 (defining a virtual word implemented in the system 100); for each subject 110, the repository 130 stores membership information indicating the category of the subject and its compliance with the corresponding rules.

An additional computer 135 operates as a supervisor, which controls the flow of application of the rules on the subjects 110. The supervisor 135 sets a global variable indicative of one or more current stages in the flow of application of the rules; the current stage variable is then published into a shared workflow repository 140, which is accessed by the subjects 110. The supervisor 135 also accesses the membership data repository 130, in order to ascertain the compliance of the subjects with the rules corresponding to each current stage; the information is used to start new stages in response to the completion of previous stages identified by the compliance of the subjects with the respective rules.

The above-described repositories implement a peer-to-peer communication model, which totally decouples the different entities of the system 100 (authority 105, subjects 110, administrator 120 and supervisor 135). Particularly, a destination decoupling results from the fact that the entities do not need to refer to each other explicitly (thereby providing a fully anonymous communication scheme); in other words, a mutual knowledge of the location of the different entities is not necessary. Moreover, time decoupling results from the fact that the entities do not need to be available at the same time.

Figure 1B:
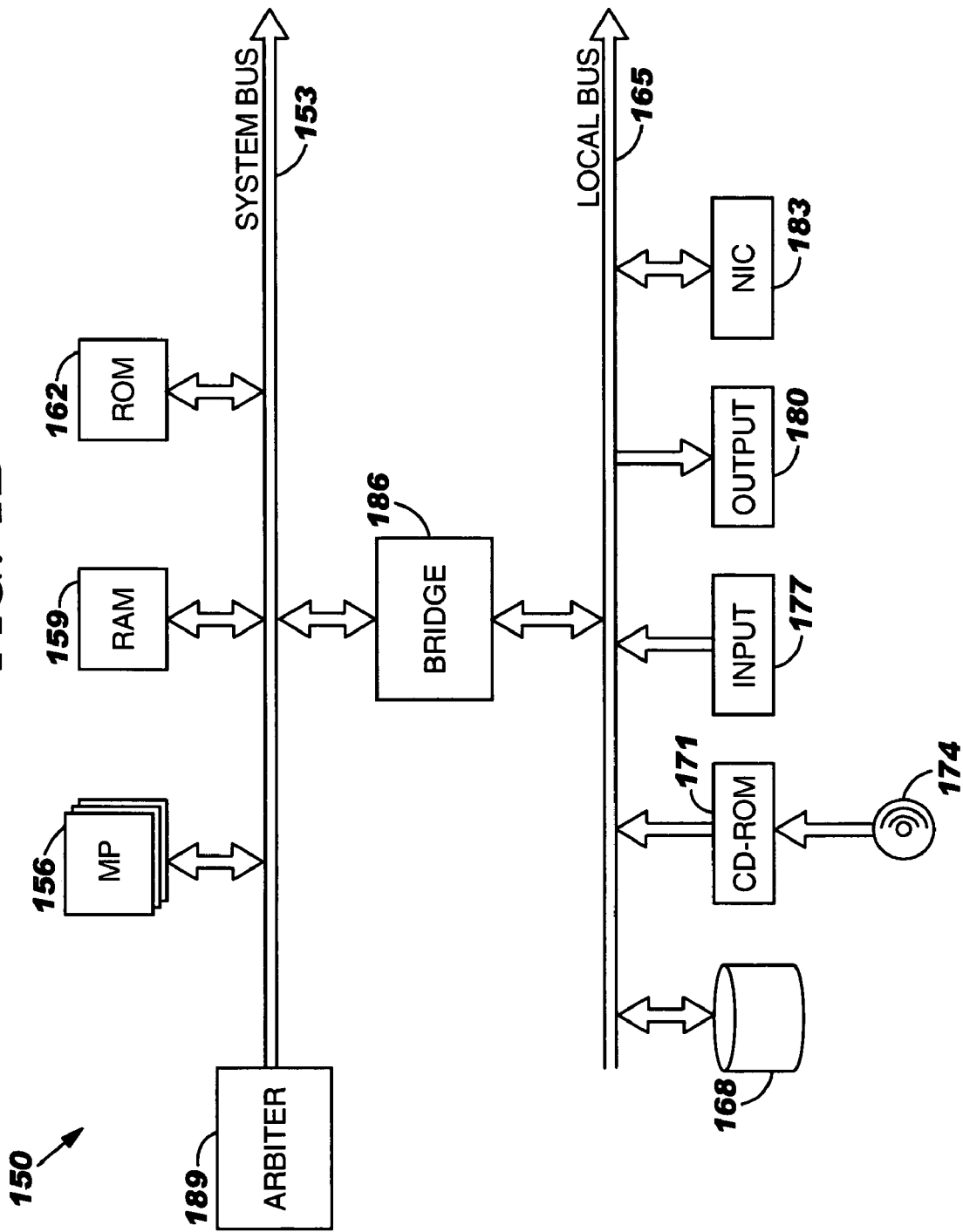
FIG. 1b shows functional blocks of a generic computer of the system.

As shown in FIG. 1b, a generic computer of the system (authority, subject, administrator or supervisor) is denoted with 150. The computer 150 includes several units that are connected in parallel to a system bus 153. In detail, one or more microprocessors (IP) 156 control operation of the computer 150; a RAM 159 (typically consisting of interleaved modules) is directly used as a shared working memory by the microprocessors 153, and a ROM 162 stores basic code for a bootstrap of the computer 150. Peripheral units are clustered around a local bus 165 (by means of respective interfaces). Particularly, a mass memory consists of one or more hard-disks 168 and drivers 171 for reading CD-ROMs 174. Moreover, the computer 150 includes input devices 177 (for example, a keyboard and a mouse), and output devices 180 (for example, a monitor and a printer). A network Interface Card (NIC) 183 is used to connect the computer 150 to the INTERNET. A bridge unit 186 interfaces the system bus 153 with the local bus 165. Each microprocessor 156 and the bridge unit 186 can operate as master agents requesting access to the system bus 153 for transmitting information. An arbiter 189 manages the granting of the access with mutual exclusion to the system bus 153.

However, the concepts of the present invention are also applicable when the data processing system has other architectures (for example, based on a LAN), or when different resources and entities are envisaged. Similar considerations apply if the computers have other structures or include equivalent units. Alternatively, two or more authorities, administrators and/or supervisors may be provided, or the authority, the administrator and/or the supervisor may be grouped into a single entity. Moreover, different repositories may be used for publishing the information about the categories of the subjects and the information about the compliance of the subjects with the corresponding rules, respectively, or two or more of the repositories may be consolidated into a single structure.

Figure 2:
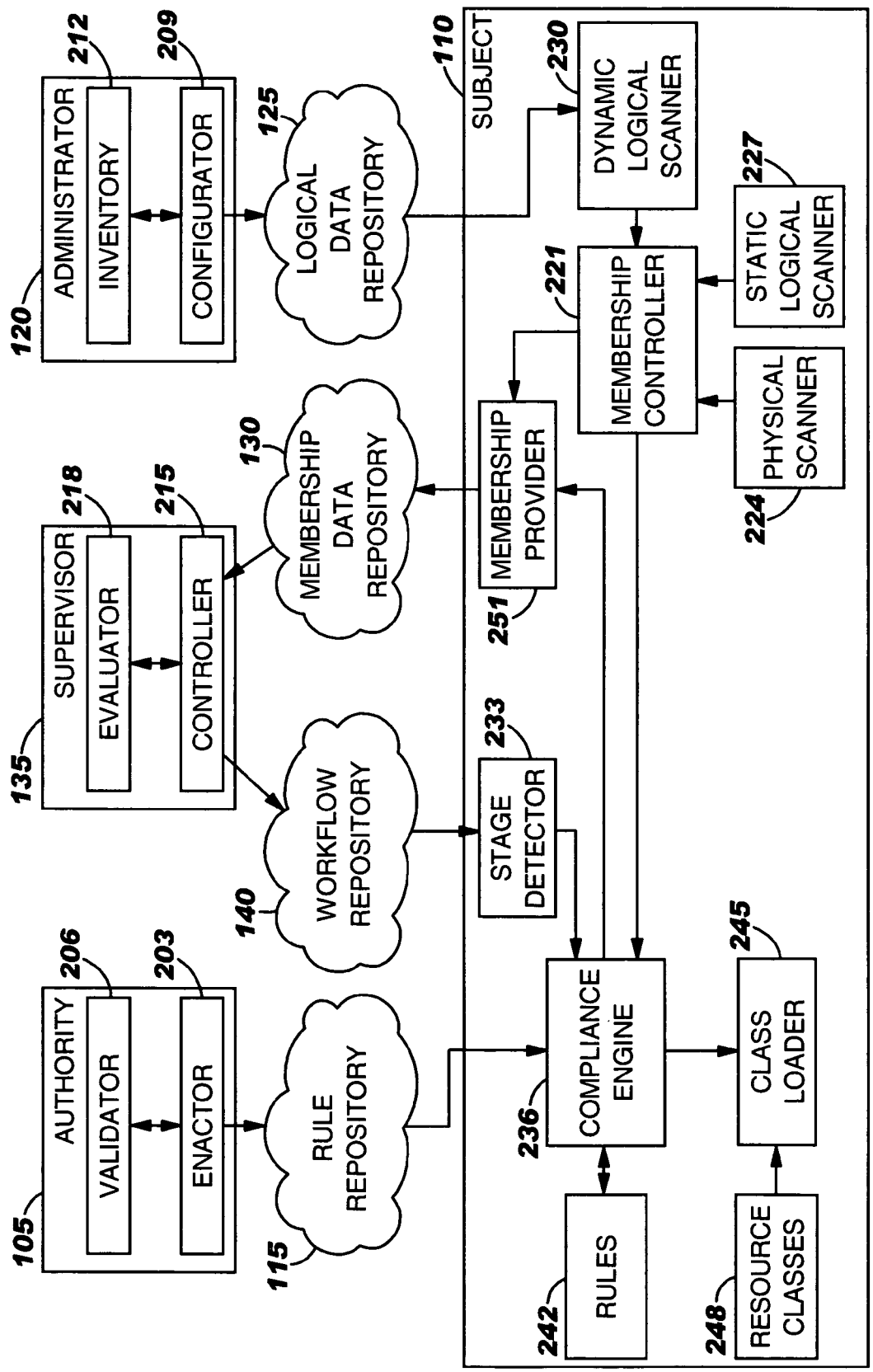
FIG. 2 depicts the main software components that can be used for practicing the method.

FIG. 2 shows software components that can be used to practice the method of the invention. The information (programs and data) is typically stored on the different hard-disks and loaded (at least partially) into the corresponding working memories when the programs are running, together with an operating system and other application programs (not shown in the figure). The programs are initially installed onto the hard disks from CD-ROMs The authority 105 includes an enactor 203 for defining new rules, for example, implementing a solution to be deployed in the system. The enactor 203 interfaces with a validator 206, which checks the semantic correctness of each new rule; if the new rule is not inconsistent with respect to the other rules, the enactor 203 publishes the new rule into the corresponding repository 115.

Passing to the administrator 120, a configurator 209 is used to set the dynamic logical properties of the subjects 110, which information is published into the corresponding repository 125. For example, those logical properties specify a current function of each subject 110 in the system such as server or agent in a monitoring application, depot in a software distribution application, and the like. For this purpose, the configurator 209 accesses the inventory 212 storing information about the organization of a company wherein the system is used.

With reference now to the supervisor 135, a controller 215 sets the current stage variable and publishes its value into the workflow repository 140. For this purpose, the controller 215 interfaces with an evaluator 218. The evaluator 218 determines when new stages can start, according to information retrieved from the membership data repository 130 (by the controller 215).

Preferably, each repository (rule repository 115, logical data repository 125, membership data repository 130 and workflow repository 140) is implemented as a Web application. Each subject 110 can register with any desired repository submitting a corresponding identifier (typically consisting of a Globally Unique Identifier, or GUID) and any other relevant information, such as its category.

Considering now a generic subject 110, a membership controller 221 is used to assign the subject 110 to the respective category according to its logical and/or physical characteristics. For this purpose, the membership controller 221 cooperates with different plug-in scanners.

A first scanner 224 assigns the subject 110 to a category defined according to its physical properties. For example, the physical category is specified by hardware characteristics (such as a hard-disk size, a CPU model, or a working memory capacity) and/or software characteristics (such as installed applications, files or folders). For this purpose, the physical scanner 224 leverages a hardware inventory explorer, a software inventory explorer and an application explorer (not shown in the figure).

A different scanner 227 statically assigns the subject 110 to a category defined according to its logical properties. For example, the static logical category specifies different groups of users such as secretaries, managers, developers, or system engineers, or different characteristics of physical entities such as desktops, laptops, PDAs, mobile telephones. The static logical scanner 227 derives the category of the subject 110 from an identification code that is input during a log-in procedure or is hardwired.

Another scanner 230 assigns the subject 110 to a category defined according to its dynamic logical properties. For this purpose, the dynamic logical scanner 230 interfaces with the logical data repository 125.

A stage detector 233 may be used to retrieve the value of the current stage variable from the workflow repository 140.

A compliance engine 236 receives the information identifying the category of the subject 110 from the membership controller 221, and the information specifying the current stage in the flow of application of the rules from the stage detector 233. The compliance engine 236 retrieves the relevant rules from the corresponding repository 115. The rule repository 115 provides the rules relating to the category of the subject 110 and corresponding to the current stage at the same time. The retrieved rules are stored into a log structure 242 and then applied to the subject 110; for each rule, the log structure 242 also stores a flag indicating whether the subject is compliant or not with the rule. The compliance engine 236 further interfaces with a class loader 245, which is used to load the classes 248 controlling the resources under management on the subject 110 (from one or more repositories, not shown in the figure). Each resource class 248 controls a state catalogue, which specifies the current state of the corresponding resource. The resource class 248 further accesses a transition table; for each pair current state/target state, the transition table indicates one or more management actions required to bring the resource from the current state to the target state.

A membership provider 251 receives information specifying the category of the subject 110 (physical category, static logical category and/or dynamic logical category) from the membership controller 221. The membership provider 251 receives information indicating the compliance of the subject 110 with the corresponding rules from the compliance engine 236. The membership provider 251 publishes the information into the corresponding repository 130.

Similar considerations apply if a whole application (consisting of the programs on the different computers) and the corresponding data are structured in a different manner, if other modules or functions are provided, or if the programs are distributed on any other computer readable medium (such as a DVD). However, the concepts of the present invention are also applicable when the new rules are not validated by the authority, or when the shared repositories are implemented with different technologies. Alternatively, the categories may be based on other characteristics of the subjects, the physical and/or logical characteristics of the subjects may be detected in a different manner, or the categories may be defined in another way (for example, with a different number and/or type of components, down to a single one). In any case, the solution according to the invention is also suitable to be implemented with the rule repository that accesses the workflow repository directly, in order to retrieve the value of the current stage variable and then mask the rules that are available for each subject accordingly.

Figure 3A:
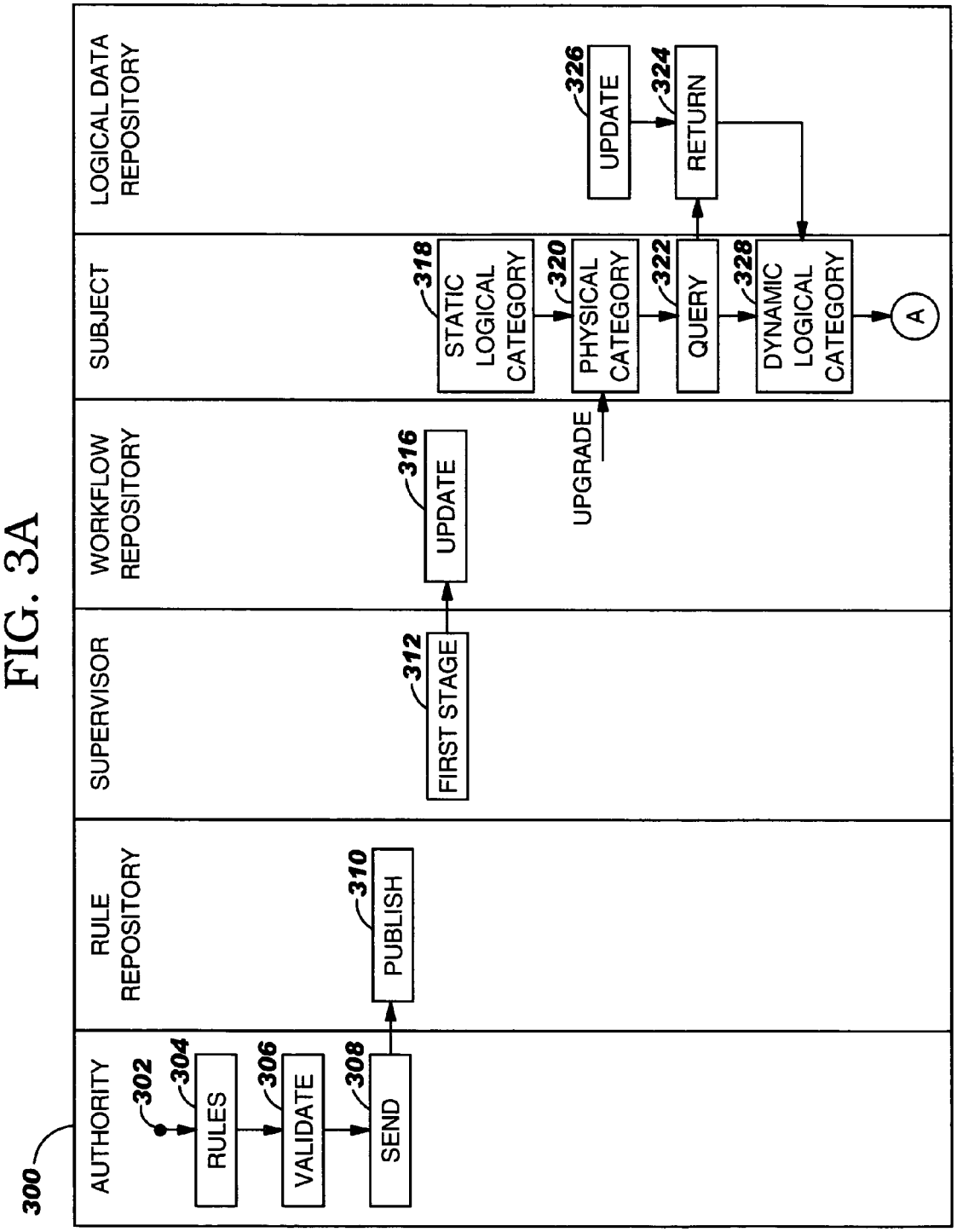
FIGS. 3a-3c show a diagram describing the flow of activities relating to an illustrative implementation of the method.
Figure 3B:
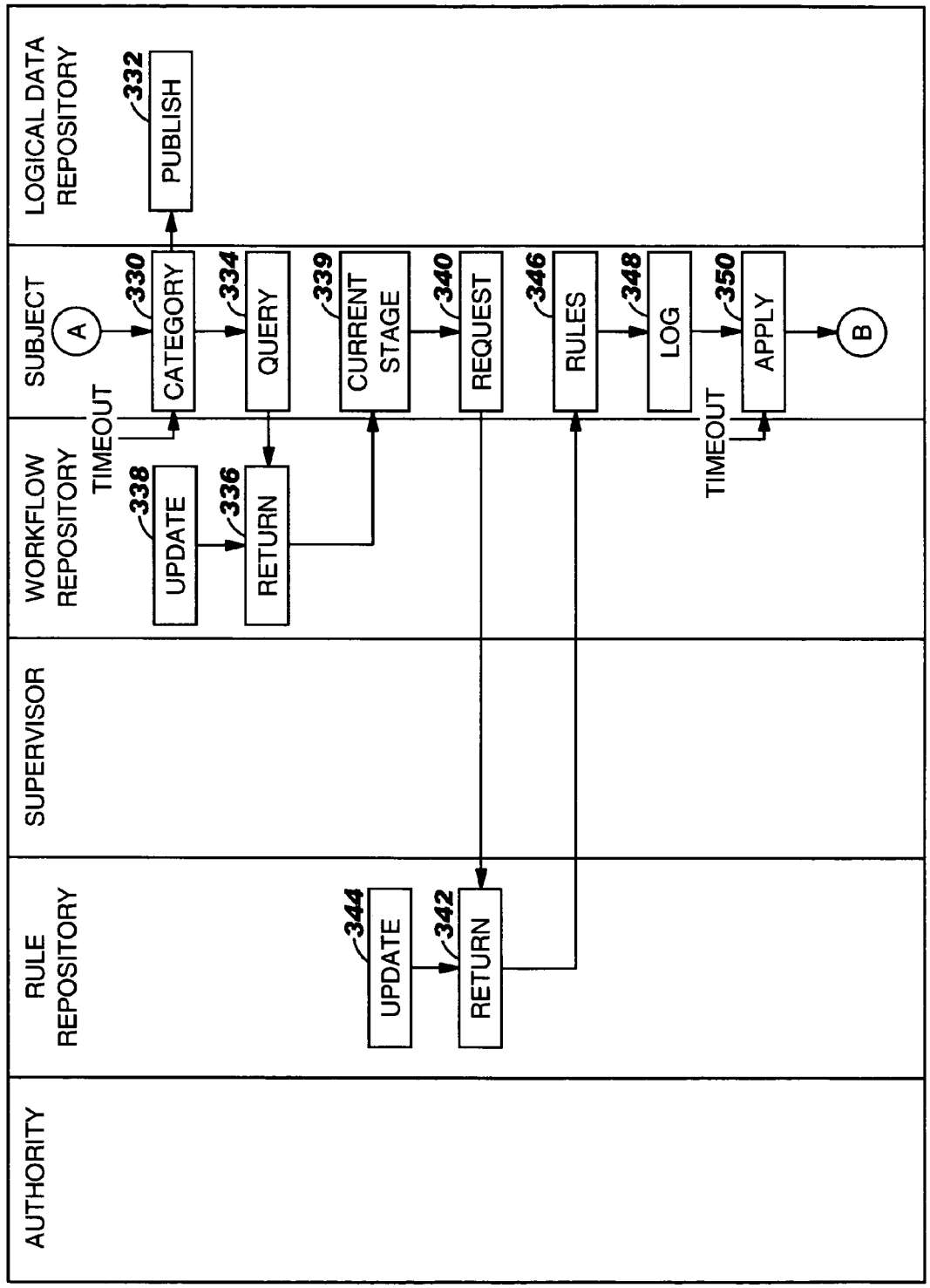
Figure 3C:
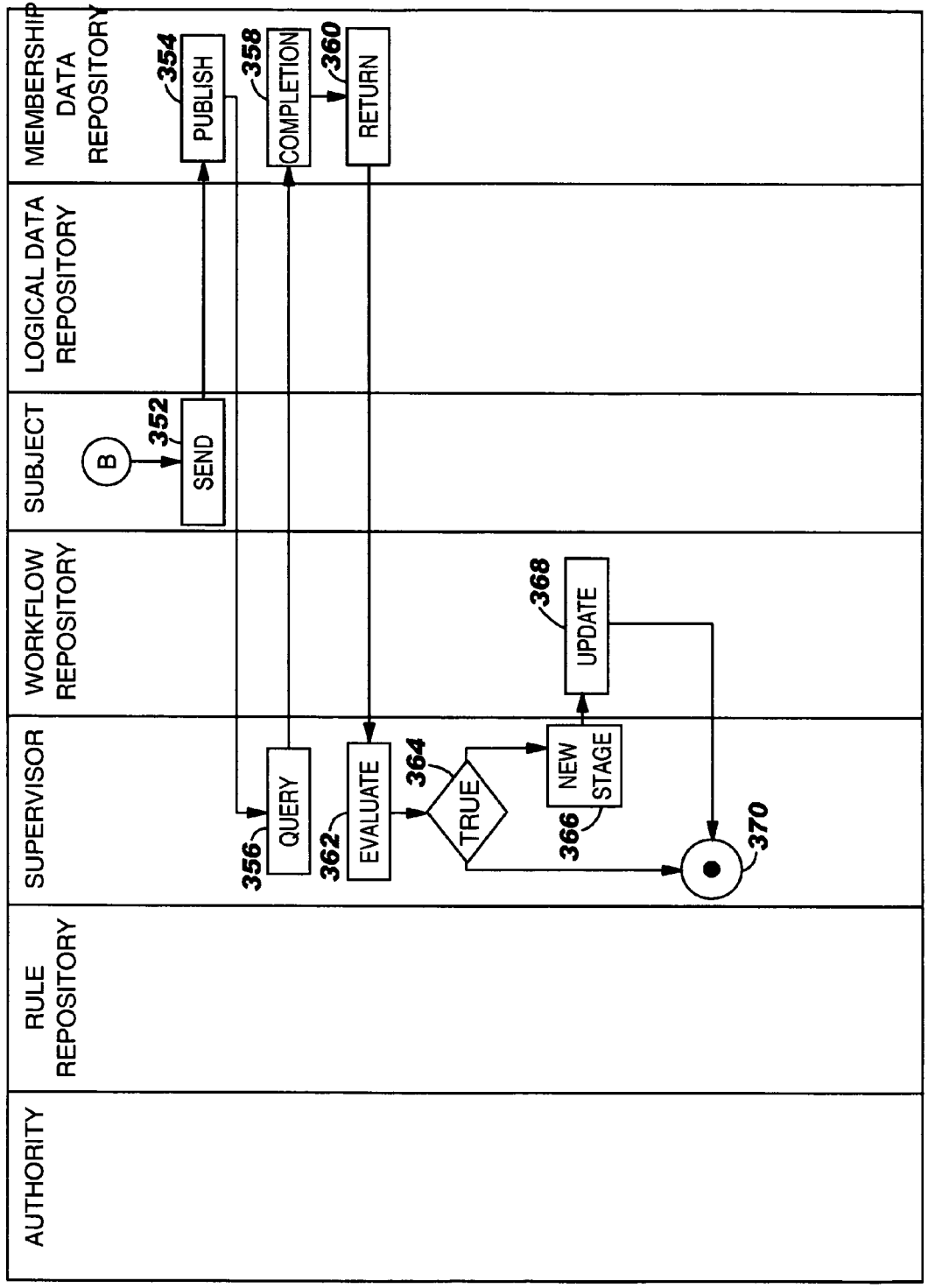

In the system described above, each subject self-adapts to the rules published by the authority according to the workflow specified by the supervisor. As shown in FIGS. 3a-3c, a corresponding process 300 begins at the start circle 302 (in the swim-lane of the authority). Descending into block 304, the authority defines a set of new rules implementing the solution to be deployed in the system. The new rules are validated at block 306 for their semantic correctness. Proceeding to block 308, the new rules, if correct, are sent to the corresponding repository. In response thereto, the new rules are published into the rule repository at block 310. With reference now to block 312, the supervisor decides to start a first stage in the flow of application of the rules relating to the deployment of the solution. Moving to the swim-lane of the workflow repository, the current stage variable is updated accordingly at block 316.

The flow of activities continues to block 318 in the swim-lane of a generic subject, wherein the static logical category of the subject is derived from the identification code that is input during the log-in procedure or is hardwired. Hardware and software scans are then executed at block 320 (assuming that the rules for installing the corresponding components have already been applied), in order to detect the physical category of the subject; the same activities are also performed in response to the notification of a software and/or hardware upgrade carried out on the subject.

The process continues to block 322, wherein the subject queries the logical data repository in order to identify its dynamic logical category. Moving to block 324 in the swim-lane of the logical data repository, the desired information is retrieved and returned to the subject. The same point is also reached from block 326 (in the swim-lane of the logical data repository), whenever updated information is published in the logical data repository for the subject (under the control of the administrator); in this way, the subject is promptly notified of any change in its dynamic logical category (assuming that the subject has previously registered with the logical data repository). Returning to the swim-lane of the subject, the category information is received from the logical data repository at block 328.

Considering now block 330, information identifying the category of the subject (static logical category, physical category and dynamic logical category) is supplied to the membership data repository. The same activity is also performed whenever a predetermined time-out expires (for example, every hour). If the category of the subject has changed, the information about the new category is published into the membership data repository at block 332.

The flow of activity continues to block 334, wherein the subject queries the workflow repository in order to retrieve the value of the current stage variable. Moving to block 336 in the swim-lane of the workflow repository, the desired information is retrieved and returned to the subject. The same point is also reached from block 338 (in the swim-lane of the workflow repository), whenever the supervisor updates the current stage variable (so that the subject is promptly notified of any change, assuming that it has previously registered with the workflow repository). Returning to the swim-lane of the subject, the value of the current stage variable is received from the workflow repository at block 339.

The flow of activities continues to block 340, wherein the rules for the category of the subject and the current stage are requested to the rule repository. Moving to the swim-lane of the rule repository, the desired rules are retrieved and returned to the subject at block 342, so as to implement a pull mode of operation. The same point is also reached from block 344 (in the swim-lane of the rule repository), whenever new rules are published for the category of the subject and for the current stage (under the control of the authority); in this way, the subject is promptly notified of any relevant new rule (assuming that the subject has previously registered with the rule repository), so as to implement a reactive mode of operation.

Returning to the swim-lane of the subject, the rules are received from the respective repository at block 346. The received rules are then logged on the subject at block 348. At block 350, all the logged rules are applied to the subject (as described in detail in the following). The same activity is also performed whenever a predetermined time-out expires (for example, every day). In this way, the new rules may be applied to the subject as soon as they are received; in addition, all the rules may be periodically reapplied, so as to implement a healing mode of operation.

The flow of activities continues to block 352, wherein information about the compliance of the subject with the rules is transmitted to the membership data repository. That information is published into the membership data repository at block 354, and the event is notified to the supervisor. In response thereto, the supervisor at block 356 queries the membership data repository for information about the completion of the current stages. Moving to the swim-lane of the membership data repository, for each stage indicated in the current stage variable, the engine of the membership data repository at block 358 verifies whether all the subjects are compliant with the corresponding rules. If so, a stage parameter indicative of the completion of the stage is asserted; conversely, if one or more subjects are not compliant the stage parameter is de-asserted. The parameters for all the stages indicated in the current stage variable are then returned to the supervisor at block 360.

At block 362, the supervisor evaluates one or more predefined logical expressions, each one defining the conditions required for starting a corresponding new stage. Particularly, the logical expression is based on one or more of the stage parameters, which are combined using standard logic operators (such as AND, OR, and so on).

The flow of activities branches at block 364 according to the result of the logical expressions. Particularly, if one or more logical expressions evaluate to true, the corresponding stages can be started (block 366). Moving to the swim-lane of the workflow repository, the current stage variable is updated accordingly at block 368; particularly, an indication of each new stage is added to the current stage variable. Preferably, the indication of the completed stages is not removed from the current stage variable; this ensures that any new subject (on which the corresponding rules must be applied) will reach the desired configuration even if it is added to the system later on. The method then ends at the concentric stop circles 370. The stop circles 370 are also reached from block 364 directly when no new stage must be started.

Figure 4A:
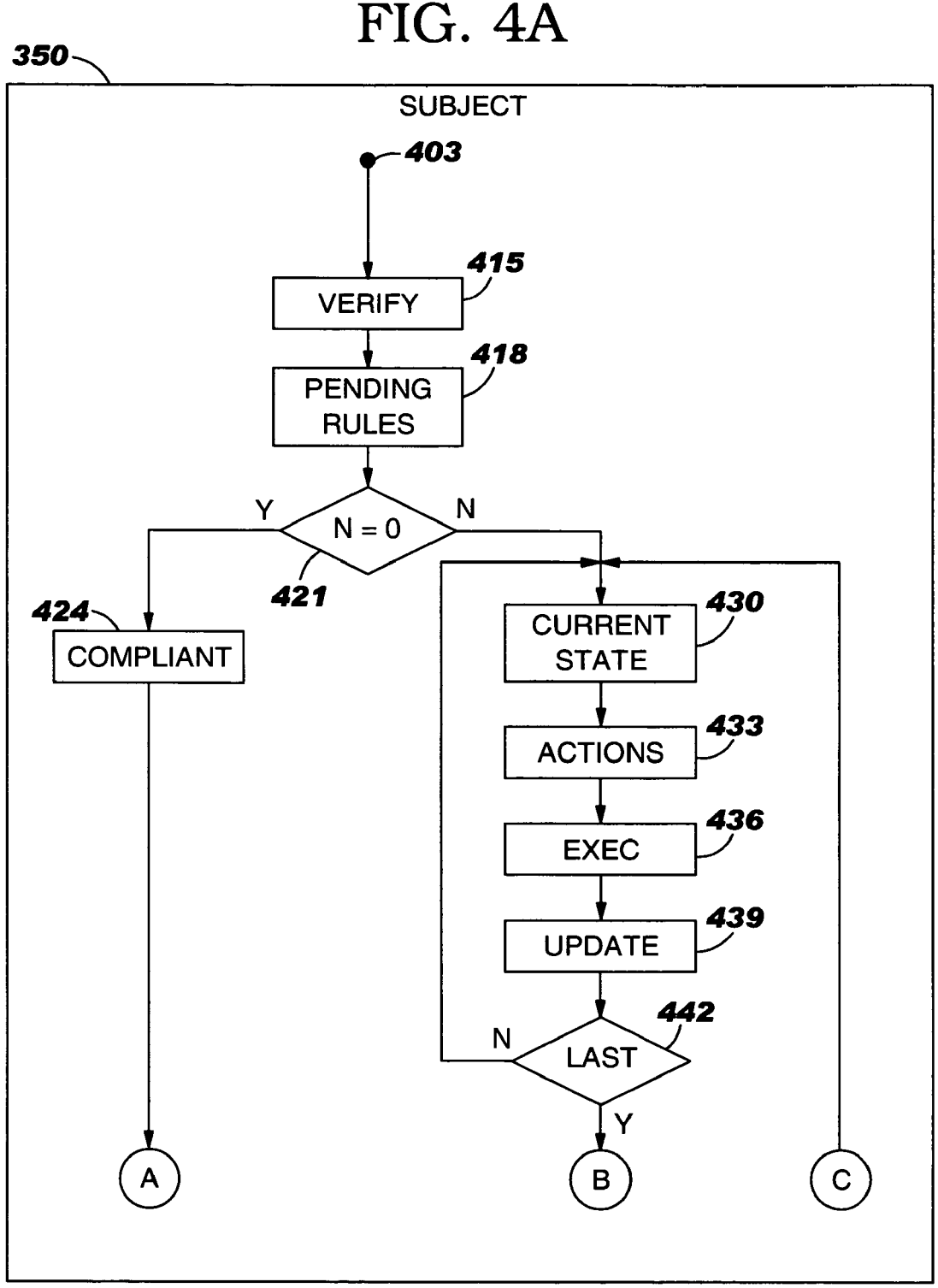
FIGS. 4a-4b detail a specific step of the method.
Figure 4B:
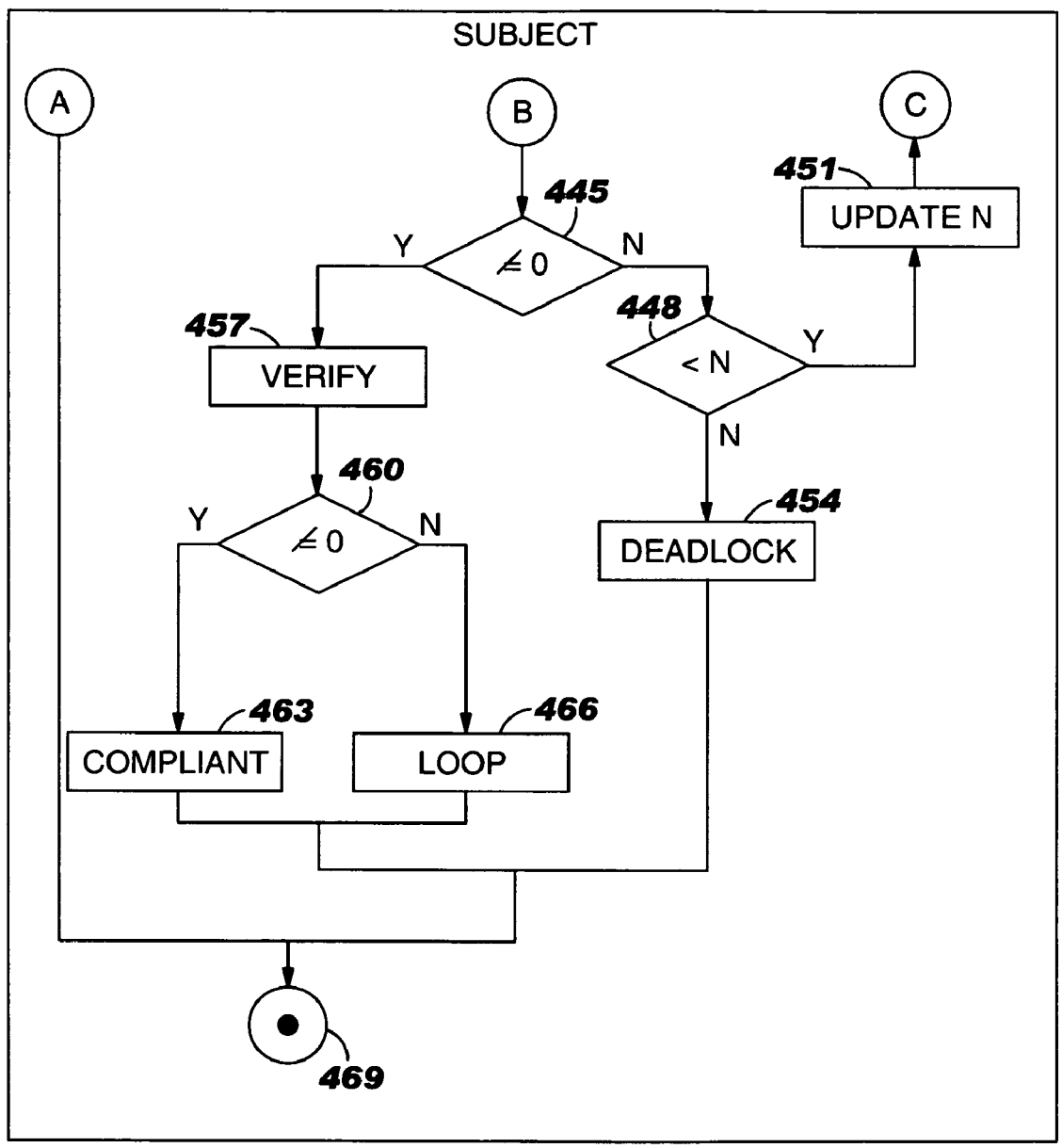

Moving now to FIGS. 4a-4b, the application of the rules to the subject implements a trial-and-error process that expands the block 350 described above. As described in detail in the following, this approach is able to resolve any dependencies among the management actions automatically. The process is executed whenever new rules for the subjects are retrieved from the respective repository or whenever the corresponding time-out expires. Should the application of the rules be requested when the process is already in progress, its execution is aborted and a new process is started.

The flow of activities starts at block 403 in the swim-lane of the subject. Continuing to block 415, the subject verifies whether the resource specified in each rule is already in the desired target state; if so, the compliance flag associated with the rule is set. At the same time, in the event of any inconsistency, the corresponding entry of the state catalog is updated accordingly. This feature is used by the subject to self-repair its configuration, restoring the correct target state of any resource. For example, let us assume that a component of an application installed on the subject such as a file has been removed by mistake or during the installation of another application. In this case, the verification of the rule used to install the application detects the inconstancy and sets the state of the application accordingly. As a consequence, when the rule is reapplied, the actions required to restore the missing file of the application will be performed automatically.

The method continues to block 418, wherein the number of pending rules with which the subject is not compliant (denoted with N) is saved. A test is then made at block 421 to verify whether the number of pending rules is zero. If so, the process passes to block 424, wherein a variable specifying the state of the subject is set to a value indicating its compliance with all the rules. The flow of activity then ends at the stop circles 469.

Returning to block 421, if the number of pending rules is greater than zero, the process enters a loop at block 430. For each pending rule, starting with the first one, the current state of the corresponding resource is detected. Proceeding to block 433, a list of the actions needed to bring the resource to the target state (specified in the pending rule) from its current state is extracted from the corresponding transition table. The process continues to block 436, wherein the actions are executed on the subject. At block 439, the entry of the state catalogue for the resource is updated accordingly. Moreover, if the application of the rule has been successful (bringing the resource to the desired target state) the corresponding compliance flag is set. The subject then verifies at block 442 whether the last pending rule has been processed. If not, the process returns to block 430 in order to execute the operations described above on a next pending rule.

Once the pending rules have been processed, the flow of activity descends into block 445. A test is then made to determine whether the number of rules still pending is zero. If not, the subject verifies at block 448 whether the number of rules currently pending is less than N, i.e., their number has decreased. If the result of the test is positive, the method continues to block 451 wherein the number of pending rules N is updated accordingly. The flow of activity then returns to block 430, in order to repeat the operations described above on the rules still to be applied.

Conversely, if the subject at block 448 determines that the number of pending rules has not decreased, the process descends into block 454. In this condition, a deadlock is detected, since some pending rules are prevented from successfully bringing the corresponding resources to their target states. In response thereto, the state variable is set accordingly to a value indicative of the deadlock condition. The process then ends at the stop circles 469.

At block 445, if the number of pending rules is zero, the flow of activity descends into block 457. For each rule, the subject verifies again whether the resource specified in the rule is still in the desired target state. If not, the corresponding compliance flag is reset. The method then descends into decision block 460. If the subject determines that it is still compliant with all the rules, the state variable is set accordingly at block 463. Conversely, if the subject is not compliant with one or more rules any longer an infinite loop is detected, since the application of some rules impairs the target state reached by the resources corresponding to other rules. The state variable is set accordingly at block 466 to a value indicative of the loop condition. In both cases, the process then ends at the stop circles 469.

Similar considerations apply if an equivalent process is executed or if additional functions are provided. However, the concepts of the present invention are also applicable when the subjects operate in other ways (for example, only in the pull mode or only in the reactive mode), or when the application of the rules on the subjects involves different operations. For example, in alternative embodiments of the present invention, the rules may include formal parameters defining a logical correlation with another category (which formal parameters are resolved at run-time into the actual subjects belonging to the corresponding category according to the information stored in the membership data repository). Moreover, the administrator may enforce corrective actions on non-compliant subjects, or the system may include one or more subjects operating as helpers for controlling the application of the rules on subjects that are not completely autonomous (for example, on mobile telephones). However, the concepts of the present invention are also applicable when different operators are used in the logical expressions, or when equivalent evaluation principles are used for determining when new stages can be started.

Preferably, each rule is specified in the Extensible Markup Language (XML), which allows the creation of customized tags for any desired purpose. Each rule starts with a <LAW> tag and ends with a </LAW> tag. The rule includes a WHO clause (which is enclosed between the tags <WHO> and </WHO>), an optional STAGE clause (which is enclosed between the tags <STAGE> and </STAGE>), and a WHAT clause (which is enclosed between the tags <WHAT> and </WHAT>).

The WHO clause defines the category associated with the rule by means of one or more key/value pairs. Each component of the category is specified by a tag including the key GROUP, which defines the name of the category component; this tag is followed by the actual value of the category component enclosed between the tags <constant> and </constant>. The category components can be combined with standard logic operators (such as AND, OR, NOT, and the like).

The STAGE clause specifies when the rule must be retrieved and applied. This information is provided by a list including the names of one or more stages, which list is enclosed between the tags <STAGE> and </STAGE>. The STAGE clause is not necessary when the application of the rule does not relate to any workflow.

The WHAT clause describes the resource to be configured by the rule. In detail, the resource is defined between the tags <RESOURCE_DEFINITION> and </RESOURCE_DEFI-NITION>; for example, the rule specifies a type of the resource (enclosed between the tags <RESOURCE_TYPE> and </RESOURCE_TYPE>), a repository from which corresponding software components can be downloaded (enclosed between the tags <RESOURCE_REPOSITORY> and </RESOURCE_REPOSITORY>), the name of its class (enclosed between the tags <RESOURCE_CLASS> and </RESOURCE_CLASS>), the identification of a specific instance of the resource (enclosed between the tags <INSTANCE_IDENTIFIER> and </INSTANCE_IDENTIFIER>), and the like. The target state of the resource under management is defined between the tags <DESIRED_STATE> and </DESIRED_STATE>. Any argument of the rule is enclosed between the tags <ARGUMENT> and </ARGUMENT.

For example, let us consider the following rule:

```
<LAW>
    <WHO>
        <eq>
            <GROUP name=myGroup/>
            <constant>myCategory</constant>
        </eq>
    </WHO>
    <STAGE>myStage</STAGE>
    <WHAT>
        <RESOURCE_DEFINITION>
            <RESOURCE_TYPE>myResource</RESOURCE_TYPE>
            <INSTANCE_IDENTIFER>myInstance</INSTANCE_IDENTIFIER>
        </RESOURCE_DEFINITION>
        <DESIRED_STATE>myState</DESIRED_STATE>
    </WHAT>
</LAW>
```

The rule applies to all the subjects belonging to the category "mycategory" (in the group "myGroup"); the rule must be applied in the stage "myStage." The rule forces the subjects to bring the instance "myInstance" of the resource "myResource" to the target state "myState."

Figure 5:
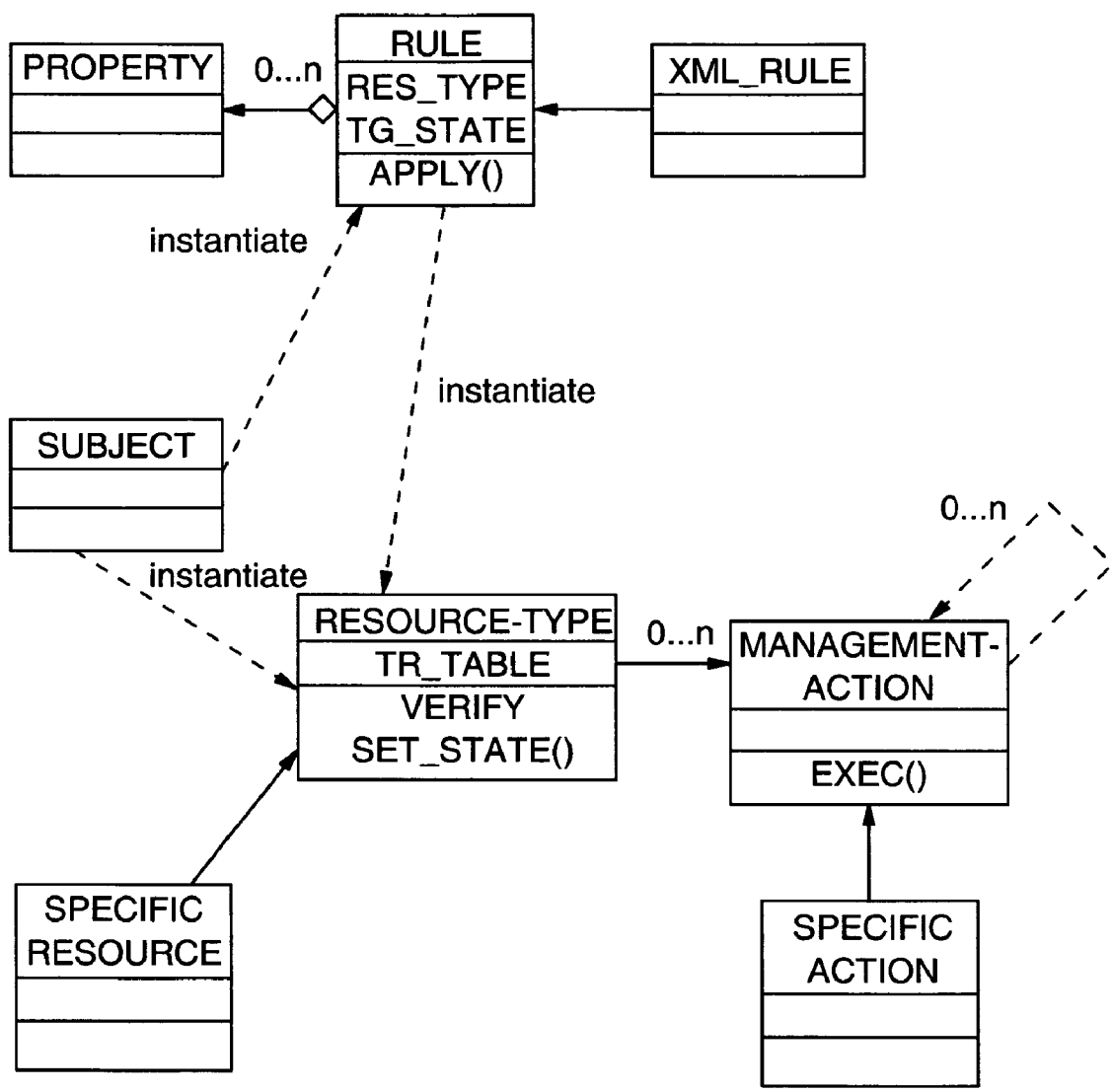
FIG. 5 depicts a class diagram pertinent to the method.

The above-described management environment is preferably implemented with a software application that is written in an object-oriented language such as Java. As shown in FIG. 5, a corresponding class diagram includes a class "SUBJECT," representing a generic subject in the system. The class "SUBJECT" instantiates objects of a class "RULE," which represents a generic rule published by the authority. The class "RULE" has a private attribute "RES_TYPE" (specifying the class name of the corresponding resource) and a private attribute "TG_STATE" (specifying the target state of the resource). Moreover, the class "RULE" exposes a public method "APPLY" for implementing the rule on the subject.

The class "RULE" has a collection consisting of any number of objects instantiating a class "PROPERTY," each one of these objects includes additional information needed to apply the rule. A class "XML_RULE" extends the class "RULE," the class "XML_RULE" defines an actual implementation of the rule.

The class "RULE" and the class "SUBJECT" instantiate objects implementing an interface "RESOURCE_TYPE," which represents a generic resource under management. The interface "RESOURCE_TYPE" declares an abstract attribute "TR_TABLE" for the corresponding transition table. The interface "RESOURCE_TYPE" may also expose a public method "VERIFY" (for validating the state of the resource) and a public method "SET_STATE" for bringing the resource to the desired target state.

The interface "RESOURCE_TYPE" is implemented by concrete classes generically denoted as "SPECIFIC_RESOURCE," each one corresponding to a different type of resource such as a file, a directory, a software package, a monitoring activity, and so on. Each class "SPECIFIC_RESOURCE" defines the content of the transition table in the attribute "TR_TABLE."

The interface "RESOURCE_TYPE" is further associated with any number of objects implementing an interface "MANAGEMENT_ACTION" which in turn is recursively associated with itself. The interface "MANAGEMENT_ACTION" exposes a public method "EXEC" for performing the required operations on the subject.

The interface "MANAGEMENT ACTION" is implemented by concrete classes generically denoted as "SPECIFIC_ACTION," each corresponding to a different type of management action such as add, remove or change the attributes of a file/directory, install, remove or restore a software package, trigger or stop a monitoring activity, and so on. Each class "SPECIFIC_ACTION" actually defines the method "EXEC."

The application of a generic rule involves the instantiation of an object of the type "XML_RULE" passing the corresponding XML definition as a parameter, followed by the calling of the method "APPLY." The method "APPLY" instantiates an object of the type "SPECIFIC_RESOURCE" whose name is stored in the attribute "RES_TYPE."

The verification of the compliance of the subject with the rule (at the beginning and at the end of the application of all the rules) is carried out calling the method "VERIFY." The actual application of the rule starts with the calling of the method "SET_STATE" on the object of the type "SPECIFIC_RESOURCE" (passing the target state stored in the attribute "TG_STATE" as a parameter). The method "SET_STATE" determines the current state of the resource and then queries the transition table (stored in the attribute "TR_TABLE"), in order to determine the management actions required to bring the resource to the target state from its current state. One or more objects of the corresponding type "SPECIFIC_ACTION" are instantiated, and the method "EXEC" is called on every one of them.

However, the concepts of the present invention are also applicable when the rules are defined in different ways such as, for example, using a tuple space, or when the software application implementing the management environment is written in different languages, including non object-oriented. Similar considerations apply if the rules have a different structure, or if other classes, interfaces, attributes and/or methods are envisaged. Alternatively, the stage of each rule is specified in a different way or it is not explicitly indicated in the rule. For example the rule repository can include different databases, each one for a corresponding stage. Whenever a new rule is defined by the authority, the rule is published into the database relating to the corresponding stage.

Figure 6:
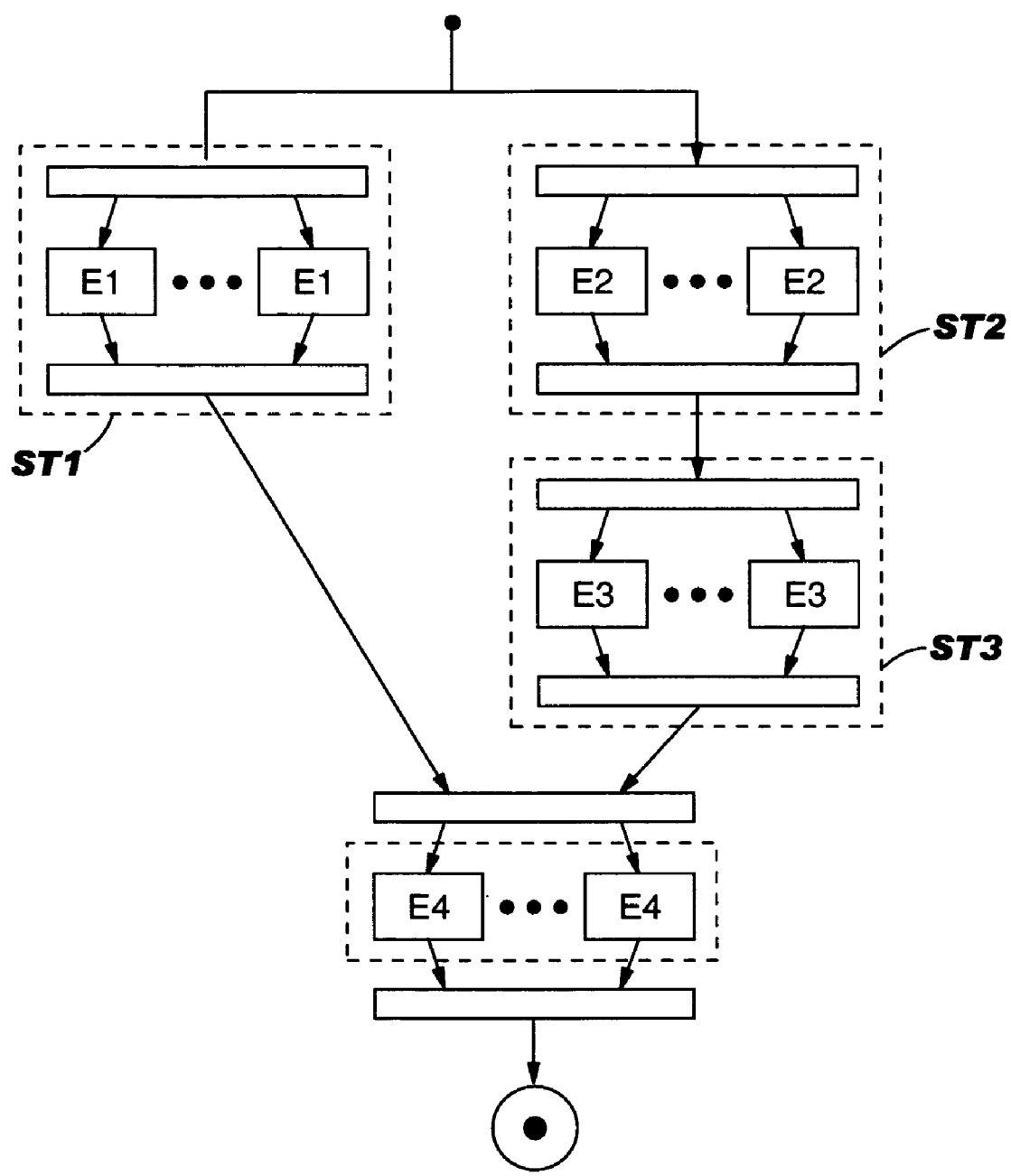
FIG. 6 is an activity diagram illustrating an exemplary workflow supported by the method.

The scenario involved by the deployment of an exemplary solution is illustrated in the sequence diagram of FIG. 6. The solution has four components. Each component involves the application of a set of rules associated with a corresponding stage (ST1, ST2, ST3 and ST4). The rules of each stage ST1-ST4 must be applied on the subjects belonging to a corresponding category, denoted with E1, E2, E3 and E4, respectively.

For example, the stage ST1 is used to deploy a web service implementing a customer relationship management (CRM) application. The stage ST2 relates to the installation of a distributed database; the stage ST3 deploys a further web service, which provides a storage management application based on the distributed database. At the end, the stage ST4 causes the installation of a client application that consumes the functions exposed by the above-described web services. Therefore, the stage ST4 can be started only when both the stages ST1 and ST3 have been completed; the stage ST3 in turn requires the completion of the stage ST2.

The corresponding workflow is expressed in the supervisor by the following logical expressions, wherein the stage parameters are denoted with the same names of the corresponding stages:

ST2 ->ST3

ST1 AND ST3 ->ST4

The deployment of the solution is started setting the current stage variable (CSV) to the value:

CSV=ST1 ST2

In response thereto, all the rules relating to the stage ST1 and all the rules relating to the stage ST2 are retrieved and applied by the subjects belonging to the corresponding categories (E1 and E2, respectively). Once the subjects E2 become compliant with the rules of their category, the stage ST2 is complete and the corresponding stage parameter is asserted. As a consequence, the logical expression "ST2" evaluates to true. The stage ST3 is then added to the current stage variable (i.e., CSV=ST1 ST2 ST3), so as to start its execution. Likewise, the expression "ST1 AND ST3" becomes true when both the stage ST1 and the stage ST3 are complete, i.e., all the subjects E1 and all the subjects E3 are compliant with the rules of their categories. The stage ST4 is then added to the current stage variable (CSV=ST1 ST2 ST3 ST4), thereby starting the execution of the last stage of the workflow. As soon as all the subjects E4 are compliant with the corresponding rules, the deployment of the solution is complete.

Similar considerations apply to different scenarios, which relate to alternative applications or involve other rules, subjects and/or stages. Moreover, the proposed solution can also be applied to control the flow of application of the rules on the same subject, in addition to or in alternative to the above-described trial-and-error approach.

More generally, the present invention proposes an autonomic management method, which is applicable in a data processing system including a plurality of subject entities and one or more authority entities. The method is used for self-configuring the subject entities. Each subject entity belongs to one or more of a plurality of categories. In the method of the invention, the authority entity publishes a plurality of rules. Each rule defines a target state for a category. At least one of the rules is associated with one or more stages in a predefined flow of application of the rules. The authority entity also publishes an indication of one or more current stages. Each subject entity then applies each rule for the category of the subject entity and corresponding to the current stage, in order to configure the subject entity according to the target state defined in the rule.

The invention provides a management method that implements a self-adaptive model. In this way, the subjects are no longer passive entities, but they actively participate in the management process. Nevertheless, the devised method allows controlling a flow of application of the rules. This result is achieved without impairing the self-adaptive model. In other words, the invention combines the opposite requirements of separating the definition of the rules from their application and at the same time allowing some sort of control on the corresponding workflow.

The proposed method makes it possible to resolve any dependencies among the management actions. The devised solution ensures a correct sequencing of the management actions on the different subjects. Moreover, the invention allows handling any conditioning among the different stages of the workflow. As a consequence, the definition of any solution to be deployed in the system is simplified.

The preferred embodiment of the invention described above offers further advantages. Each subject only retrieves the rules for its category relating to the current stage. In this way, the definition of the workflow does not affect the compliance of the different subjects with the corresponding rules in any stage.

A suggested choice for implementing the proposed method is that of having the authority publish the rules and the supervisor, or an equivalent authority, publish the current stage variable. Therefore, the definition of the desired solution and the control of its actual deployment can be entrusted to distinct entities.

However, the present invention may be put into practice with each subject that always retrieves all the rules for its category, but only applies the ones relating to the current stage; alternatively, the definition of both the rules and their flow of application is controlled by a single authority.

In a preferred embodiment of the invention, the current stage variable is set according to the configuration of the subjects published in the membership data repository.

The proposed technique makes it possible to control the workflow as the application of the rules progresses. Particularly, one or more new stages are started as soon as the subjects are compliant with the rules corresponding to one or more previous stages. This allows starting stages that depend on the completion of other stages automatically.

A way to further improve the solution is to define a logical expression for each stage, which expression is based on parameters indicative of the completion of other stages; the stage is started once the corresponding logical expression evaluates to true.

The devised solution supports the definition of complex dependency schemes in a simple manner. Preferably, the previous stages are maintained in the current stage variable. This ensures that any new subject added to the system will always apply the rules for its category even, if the corresponding stage has already been completed.

Alternatively, the current stage may be defined and set in a different way. Particularly, a new stage may be started when at least one subject, or a predefined percentage of the subjects, is compliant with the rules corresponding to a previous stage. For example, this feature allows the clients to use a web service as soon as a single server is available. In any case, the proposed method is also suitable to be used when the current configuration of the subjects is detected by the supervisor directly, when only simple dependencies between two stages are supported, or even when any complete stage is removed from the current stage variable. Moreover, in a different embodiment of the invention the starting of the new stages is controlled manually, for example when an operator decides to deploy a specific application.

Advantageously, the present invention may be implemented with a computer program, which is provided as a corresponding product stored on a suitable medium. Alternatively, the program may be pre-loaded onto the hard-disks, sent to computers through a network such as the INTERNET, broadcast, or more generally provided in any other form loadable into the working memories of the computers. However, the method according to the present invention leads itself to be carried out also with a hardware structure such as integrated in chips of semiconductor material, or with a combination of software and hardware.

Naturally, in order to satisfy local and specific requirements, a person skilled in the art may apply to the solution described above many modifications and alterations all of which, however, are included within the scope of protection of the invention as defined by the following claims.

We claim:

1. In a data processing system including a number of subject entities and at least one authority entity, an autonomic management method for self-configuring the number of subject entities, each subject entity belonging to at least one of a number of categories, wherein the method includes:
   the at least one authority entity publishing a number of rules to said subject entities, each rule defining a target state for one of the number of categories, at least one of the number of rules being associated with at least one stage in a predefined flow of application of the rules;
   the at least one authority entity publishing an indication of at least one current stage to said subject entities; and
   each subject entity applying each rule for the at least one of the number of categories and corresponding to the at least one current stage, to configure each subject entity according to the target state defined in the number of rules.

2. The method according to claim 1, further including, under the control of each subject entity:
   retrieving each rule for the at least one of the number of categories and corresponding to the at least one current stage; and
   applying each retrieved rule.

3. The method according to claim 2, wherein the at least one authority entity includes a first authority entity for publishing the number of rules and a second authority entity for publishing the indication of the at least one current stage.

4. The method according to claim 3, further including:
   each subject entity publishing an indication of its configuration; and
   the at least one authority entity setting a global variable indicative of the at least one current stage according to the configuration of the number of subject entities.

5. The method according to claim 4, further including, under the control of the at least one authority entity:
   adding at least one first stage to the global variable;
   monitoring a compliance of the number of subject entities with the number of rules corresponding to the at least one first stage; and
   adding at least one second stage to the global variable according to the compliance of the number of subject entities with the number of rules corresponding to the at least one first stage.

6. The method according to claim 5, further including:
   detecting a completion of each first stage in response to the compliance of the number of subject entities with the corresponding number of rules;
   evaluating a predefined logical expression for each second stage, the logical expression being based on at least one parameter indicative of the completion of a corresponding first stage; and
   adding each second stage to the global variable in response to an assertion of the corresponding logical expression.

7. The method according to claim 6, wherein the at least one first stage is maintained in the global variable after adding the at least one second stage.

8. A data processing system operating in a peer-to-peer distributed computing environment, the data processing system comprising:

a number of computers configured as subjects, said subjects being configured to self-categorize themselves and publish resulting categorization information to a membership repository;

a computer configured as an authority, said authority publishing rules defining a desired configuration of said data processing system to a rule repository;

a computer configured as a supervisor, said supervisor evaluating a current stage of said subjects by accessing said membership repository and publishing a current stage variable in a work flow repository;

wherein said subjects are configured to be destination decoupled and time decoupled from said authority and said supervisor; said subjects autonomously configuring themselves by accessing said rules within said rule repository and accessing said current stage variable within said work flow repository.

9. The system of claim 8, wherein said subjects self-categorize themselves using a membership controller coupled to at least one of: a physical scanner, a static logical scanner, and a dynamic logical scanner.

10. The system of claim 8, wherein said subjects autonomously configure themselves using a compliance engine, said compliance engine accessing a resource class to retrieve a current state and a transition table, said transition table indicating management actions required to bring said subject from said current state to a target state.

* * * * *